Aug. 29, 1950   H. HALVARSSON   2,520,541
DEVICE FOR SETTING OR CHECKING GAUGES
Filed July 13, 1948

Inventor
HARALD HALVARSSON,
By Pierce, Scheffler & Parker,
Attorneys

Patented Aug. 29, 1950

2,520,541

UNITED STATES PATENT OFFICE 2,520,541

DEVICE FOR SETTING OR CHECKING GAUGES

Harald Halvarsson, Ektorp, Sweden

Application July 13, 1948, Serial No. 38,367
In Sweden July 23, 1947

6 Claims. (Cl. 33—143)

This invention relates to improvements in reference gages, i. e. gages preferably adapted for testing or checking measuring tools such as snap gages or other inspection gages.

One of the objects of the invention is to provide an improved construction in a gage of this character so as to obviate inaccurate measurement by unintentional tilting of the inspection gage when applying same to the reference gage. Another object of the invention consists in the provision of a reference gage that is adjustable to accurately check any dimensions within wide limits. Still another object of the invention consists in the provision of an adjustable reference gage in which small gage blocks can be used for checking relative large dimensions whereby the accuracy of such checking is increased.

With these and other objects in view, the invention resides in the combination and arrangement of parts and in the details of construction hereinafter described and claimed, it being understood that the changes in the precise embodiment of the invention herein disclosed, may be made within the scope of what is claimed, without departing from the invention.

Figure 1:
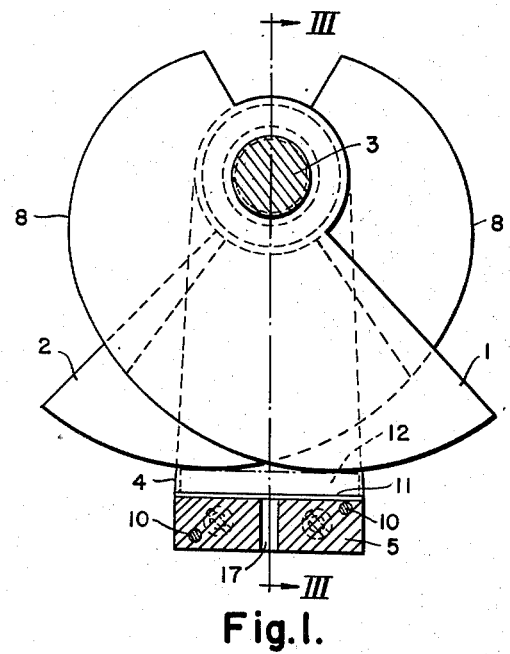
Fig. 1 is a side view partly in section, of a reference gage embodying the invention.

Referring to the drawings, the gage has two discs 1 and 2 which are rotatably mounted on a spindle 3. The spindle 3 is mounted in two standards 4 which are secured by screws 14 to a base plate 5, having a hole 17 for securing the gage to a bed plate or table. Dowels 10 serve to retain said standards in fixed positions relative to said base plate. The spindle 3 has threaded ends 15 and a double conical portion 7 located intermediate of said threaded ends. The discs are mounted on said conical portion which projects into tapered holes 18 in the standards 4. To said threaded ends 15 are screwed nuts 6. By tightening the nuts 6 the standards 4 are pressed against the discs 1 and 2 so that said discs will be pressed against the conical portion 7 of the spindle 3 and secured to said spindle. Simultaneously, the standards 4 are at their tapered holes 18 pressed against said conical portion 7 to fix the spindle 3 to said standards. Thereby discs 1 and 2 will be locked in any desired angular position relative to the base plate 5 and the standards 4.

The gage discs 1 and 2 have curved peripheral surfaces 8 the contours of which form exactly equal but oppositely displaced involutes having a mutual basic circle the centre of which coincides with the centre line or axis of the spindle 3. Each surface 8 forms the curved peripheral portion of a flange 9 and a thicker portion 16 integral with said flange. The thick portions 16 of the discs 1 and 2 extend axially in part past each other so that a generatrix of the surface 8 of the disc 1 will in part extend along an oppositely disposed generatrix of the disc 2. The thick portions 16 have abutment surfaces adapted to engage each other to limit the motion of the discs 1 and 2 toward each other. This arrangement ensures or facilitates the correct application of a snap gage or the like to the reference gage viz. in a direction or position exactly transversely to the centre of rotation of both the discs 1 and 2.

The base plate 5 has two surfaces 11 each being disposed opposite to one of the disc flanges 9. Conveniently said surfaces are disposed at a level with each other. Alternately, a single broad surface can be provided instead of both the surfaces 11. The distance between said surface or surfaces and the centre line of the spindle 3 is equal to or larger than the maximum dimensions to be gaged. By positioning gage blocks 12 and 13 upon said surface or the surfaces 11 below the flanges 9 and turning the cam discs 1 and 2 so that their involute surfaces 8 engage said blocks the reference gage can be set for measures depending on the sum of the thicknesses of the gage blocks 12 and 13. This will hereinafter be explained with reference to Fig. 4.

Figure 4:
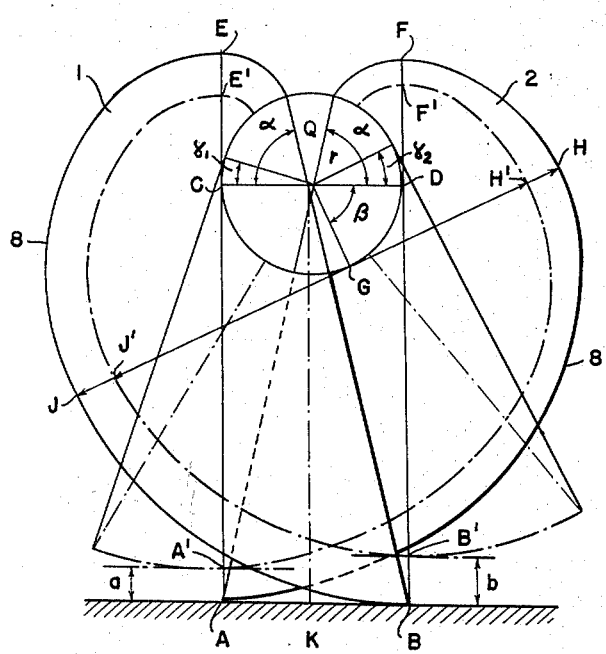
Fig. 4 is a diagrammatic view illustrating the theory underlying the invention.
Figure 3:
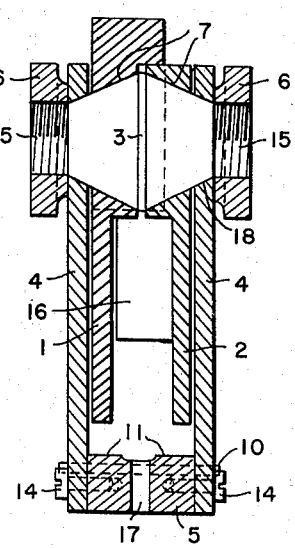
Fig. 3 is a sectional view taken on the line III—III of Fig. 1.

As shown in Fig. 4 the involute surfaces 8 of the gage discs 1 and 2 have a mutual basic circle the radius of which is $r$. The horizontal line AB represents the surfaces 11 of the base plate 5. In the positions as shown in full lines the surfaces 8 of both the discs 1 and 2 engage the surfaces 11 represented by the line AB so that said surfaces serve as abutments limiting the swing of the disc 1 in a clockwise direction and the swing of the disc 2 in a counter-clockwise direction. The line AB and consequently also the surfaces 11 extend parallel to the centre line of the spindle 3 represented by the centre Q of the basic circle and also transversely to the plane of symmetry of the discs 1 and 2 represented by the line QK and including the centre line of the spindle 3.

In Fig. 4 the following equations may be easily demonstrated by plain geometric functions:

$$ACE = BDF$$

which is assumed to be an initial or maximum measure denoted by L.

$$AC = BD = r(\pi + \alpha)$$
$$CE = DF = r.\alpha$$

Hence
$$L = r(\pi + 2\alpha)$$

This measure is obtained between both the involute surfaces 8 and irrespective of the angular direction (direction of diameter) that the snap gage occupies relative to the reference gage. Thus, if measurement is effected along the line JH forming the angle $\beta$ with the vertical line QK:

$$GH = r(\alpha + \beta)$$
$$JG = r(\alpha + \pi - \beta)$$

Hence
$$GH + JG = r(\pi + 2\alpha)$$

which is equal to L.

Figure 2:
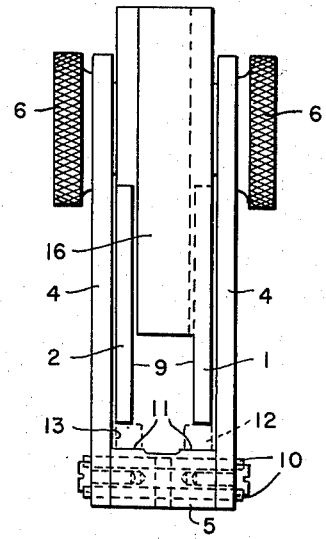
Fig. 2 is a view taken at a right angle to Fig. 1.

If it is desired to set the reference gage for a certain measure smaller than L, this can be effected by loosening the nuts 6 and swinging the disc 1 in a counter-clockwise direction and the disc 2 in a clockwise direction and thereafter introducing a gage block 12 between the cam disc 1 and one of the surfaces 11 and another gage block 13 between the cam disc 2 and the other surface 11 as shown in Fig. 2. Thereafter the discs 1 and 2 are swung back so that their involute surfaces 8 engage the blocks 12 and 13 and the nuts 6 are tightened. The thicknesses of the blocks 12 and 13 and $a$ and $b$, respectively. When thus engaging the gage blocks the disc 1 has been turned through the angle $\gamma_2$ from its position of origin and the disc 2 has been turned in the opposite direction through the angle $\gamma_1$, from its position of origin so that both the discs occupy the positions shown in dash and dot lines. Then the following relations are evident:

$$A^1C = AC - a$$

and
$$CE^1 = CE - r.\gamma_2$$

where
$$r.\gamma_2 = b$$

Hence
$$A^1C + CE^1 = AC - a + CE - b$$
$$= r(\pi + a) + r.\alpha - a - b$$
$$= r(\pi + 2\alpha) - (a + b)$$

Then
$$A^1C + CE^1 = L - (a + b)$$

Furthermore
$$B^1D = BD - b$$

and
$$DF^1 = DF - r.\gamma_1$$

where
$$r.\gamma_1 = a$$

Hence
$$B^1D + DF^1 = BD - b + DF - a$$
$$= r(\pi + \alpha) + r.\alpha - a - b$$
$$= r(\pi + 2\alpha) - (a + b)$$

Then also
$$B^1D + DF^1 = L - (a + b)$$

When measuring between the points J'H' on the line JH the following relations are evident:

$$GH^1 = GH - r.\gamma_1$$

and
$$J^1G = JG - r.\gamma_2$$

Hence
$$GH^1 + J^1G = GH + JG - a - b$$
$$= L - (a + b)$$

Thus, irrespective of the "measuring angle" $\beta$ there will always be obtained a diameter value equal to the initial or maximum value L minus the sum of the thicknesses $a$ and $b$ of the gage blocks.

In a modified embodiment of the invention the conical portion 7 of the spindle 3 does not project into the standards 4 and the threaded ends 15 of the spindle protrude freely through cylindrical holes in said standards. In such case the discs 1 and 2 will be fixed to the standards 4 by the frictional contact between the standards and the discs when said discs are pressed against the conical portion 7 of the spindle 3.

I claim:

1. A reference gage comprising a pair of curved members and pivot means for said members having a mutual axis about which the members are turnable in directions towards and away from a plane of symmetry including said axis, said members having each a curved peripheral portion shaped as an involute, the involutes having a mutual basic circle the centre of which coincides with said axis.

2. A reference gage comprising a pair of curved members and pivot means for said members having a mutual axis about which the members are turnable towards each other, said members having abutments adapted to engage each other to limit the motion of said members toward each other, said members having each a curved peripheral portion shaped as an involute, the involutes having a mutual basic circle the centre of which coincides with said axis.

3. A reference gage comprising a pair of curved members and pivot means for said members having a mutual axis about which the members are turnable in directions towards and away from a plane of symmetry including said axis, said members having each a curved peripheral portion shaped as an involute, the involutes having a mutual basic circle the centre of which coincides with said axis, said gage comprising also a surface extending in a direction parallel to said axis and transversely to said plane of symmetry at a distance from said axis corresponding at least to the maximum dimension for which the gage is provided so that the dimension of the gage can be decreased by an amount equal to the sum of the thicknesses of gage blocks positioned between and tightly engaging said surface and said peripheral portions of said curved members.

4. A reference gage comprising a pair of curved members and pivot means for said members having a mutual axis about which the members are turnable in directions towards and away from a plane of symmetry including said axis, said members having each a curved peripheral portion shaped as an involute, the involutes having a mutual basic circle the centre of which coincides with said axis, said gage comprising also a pair of surfaces each extending below one of said curved members in a direction parallel to said axis and transversely to said plane of symmetry at a distance from said axis corresponding at least to the maximum dimension for which the gage is provided so that the dimension of the gage can be decreased by an amount equal to the sum of the thicknesses of gage blocks positioned between and tightly engaging said surfaces and said peripheral portions of said curved members.

5. A reference gage comprising a pair of curved members and pivot means for said members having a mutual axis about which the members are turnable in directions towards and away from a plane of symmetry including said axis, said members having each a curved peripheral portion shaped as an involute, the involutes having a mutual basic circle the centre of which coincides with said axis, said gage comprising also a surface extending in a direction parallel to said axis and transversely to said plane of symmetry at a distance from said axis corresponding at least to the maximum dimension for which the gage is provided so that the dimension of the gage can be decreased by an amount equal to the sum of the thicknesses of gage blocks positioned between and tightly engaging said surface and said peripheral portions of said curved members, said surface serving as an abutment for said curved portions to limit the swing of said curved members apart.

6. A reference gage comprising a pair of curved members and pivot means for said members having a mutual axis about which the members are turnable in directions towards and away from a plane of symmetry including said axis, said members having each a curved peripheral portion shaped as an involute, the involutes having a mutual basic circle the centre of which coincides with said axis, said gage comprising also a pair of surfaces each extending below one of said curved members in a direction parallel to said axis and transversely to said plane of symmetry at a distance from said axis corresponding at least to the maximum dimension for which the gage is provided so that the dimension of the gage can be decreased by an amount equal to the sum of the thicknesses of gage blocks positioned between and tightly engaging said surfaces and said peripheral portions of said curved members, said surfaces serving as abutments for said curved portions to limit the swing of said curved members apart.

HARALD HALVARSSON.

No references cited.